United States Patent
Lee et al.

(10) Patent No.: US 11,906,972 B2
(45) Date of Patent: Feb. 20, 2024

(54) MOVING ROBOT SYSTEM COMPRISING MOVING ROBOT AND CHARGING STATION

(71) Applicant: LG Electronics Inc., Seoul (KR)

(72) Inventors: Jaehoon Lee, Seoul (KR); Hyunsup Song, Seoul (KR); Jongjin Woo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 203 days.

(21) Appl. No.: 17/432,626

(22) PCT Filed: Jul. 31, 2019

(86) PCT No.: PCT/KR2019/009546
§ 371 (c)(1),
(2) Date: Aug. 20, 2021

(87) PCT Pub. No.: WO2020/171317
PCT Pub. Date: Aug. 27, 2020

(65) Prior Publication Data
US 2022/0155791 A1 May 19, 2022

(30) Foreign Application Priority Data
Feb. 20, 2019 (KR) .................... 10-2019-0020047

(51) Int. Cl.
*G05D 1/00* (2006.01)
*B25J 9/16* (2006.01)

(52) U.S. Cl.
CPC .......... *G05D 1/0225* (2013.01); *B25J 9/1602* (2013.01); *G05D 1/0246* (2013.01); *G05D 1/0276* (2013.01); *G05D 2201/0208* (2013.01)

(58) Field of Classification Search
CPC .... B25J 9/1602; G05D 1/0246; G05D 1/0225
See application file for complete search history.

(56) References Cited

U.S. PATENT DOCUMENTS

| 9,373,967 B1* | 6/2016 | Sullivan ................ G08B 13/14 |
| 10,311,710 B1* | 6/2019 | Bart ..................... G08B 29/145 |

(Continued)

FOREIGN PATENT DOCUMENTS

| JP | 2001-236585 A | 8/2001 |
| KR | 10-2005-0073674 A | 7/2005 |

(Continued)

OTHER PUBLICATIONS

Office Action in Korean Patent Appl. No. 10-2019-0020047 received from the Korean Intellectual Property Office dated Sep. 3, 2020, pp. 1-5.

(Continued)

*Primary Examiner* — Khoi H Tran
*Assistant Examiner* — Aaron G Cain
(74) *Attorney, Agent, or Firm* — Birch, Stewart, Kolasch & Birch, LLP

(57) ABSTRACT

Provided is a moving robot system including a moving robot and a charging station. The charging station includes a camera formed to capture the moving robot, a communication unit configured to communicate with the moving robot, a charging contact unit configured to charge the moving robot, and a control unit configured to control the camera to receive a preview image obtained by capturing the moving robot on the basis that the moving robot having been in contact with the charging contact unit is separated from the charging contact unit. The control unit performs different types of control on the basis of whether information indicating that the moving robot is being separated from the charging contact unit is received before the moving robot is separated from the charging contact unit.

10 Claims, 9 Drawing Sheets

(56) References Cited

U.S. PATENT DOCUMENTS

| | | | |
|---|---|---|---|
| 11,543,829 B2* | 1/2023 | Komorida | A01D 34/003 |
| 2011/0111746 A1 | 5/2011 | Chiu | |
| 2011/0234153 A1 | 9/2011 | Abramson | |
| 2017/0111617 A1* | 4/2017 | Kuwahara | H04W 4/029 |
| 2018/0160035 A1* | 6/2018 | Cleveland | H04N 13/239 |
| 2020/0363704 A1* | 11/2020 | Saçan | F16M 11/28 |

FOREIGN PATENT DOCUMENTS

| | | |
|---|---|---|
| KR | 10-2008-0050278 A | 6/2008 |
| KR | 10-2015-0125508 A | 11/2015 |
| KR | 10-2017-0072475 A | 6/2017 |
| KR | 10-2018-0106472 A | 10/2018 |
| KR | 10-2018-0134155 A | 12/2018 |

OTHER PUBLICATIONS

Notice of Allowance in Korean Patent Appl. No. 10-2019-0020047 received from the Korean Intellectual property Office dated Dec. 10, 2020, pp. 1-2.

* cited by examiner

FIG. 8A
(a) 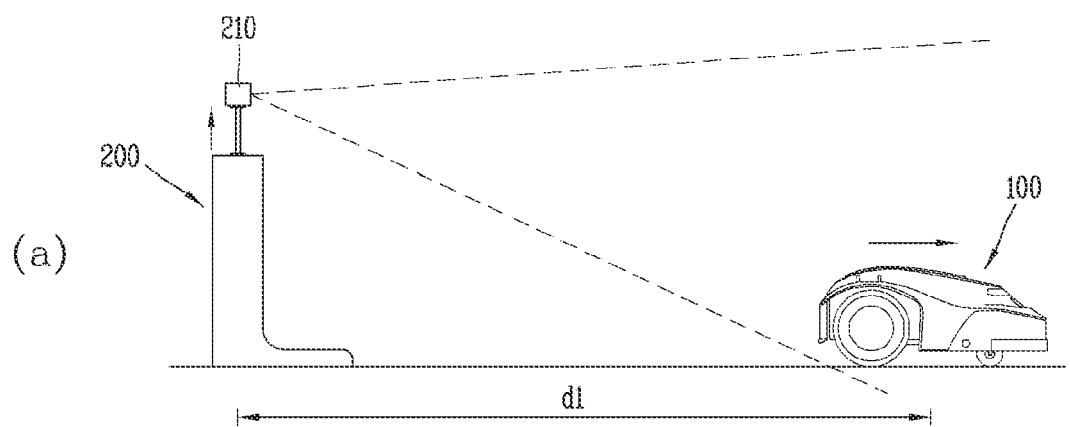
(b) 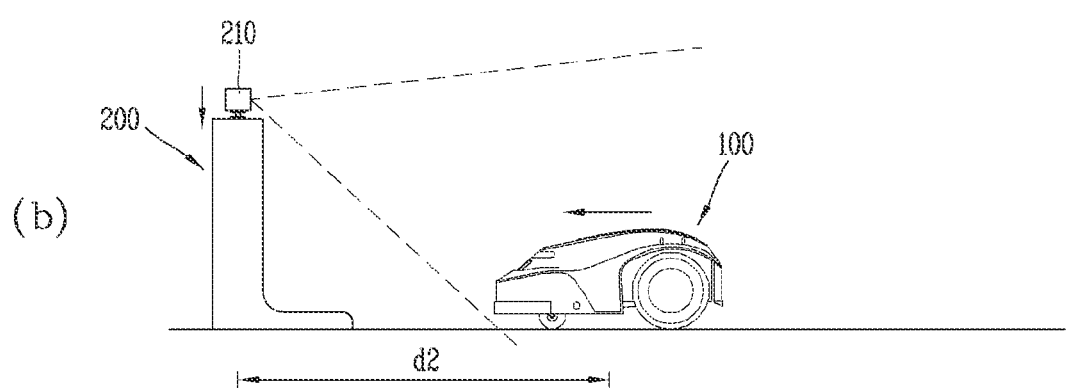

FIG. 8B
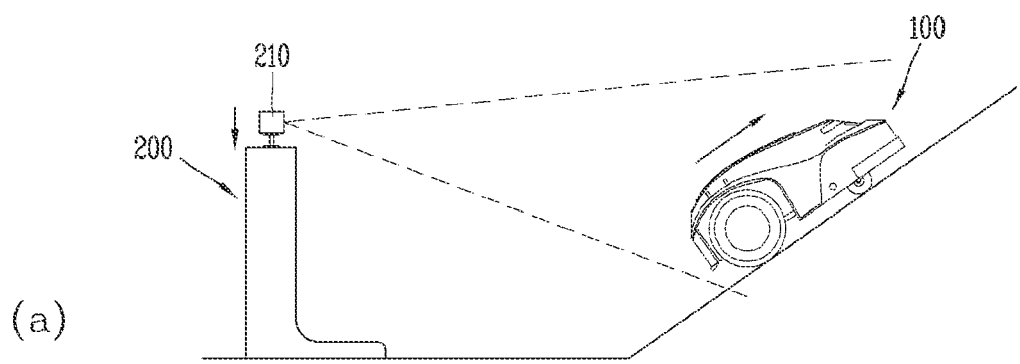
(a)
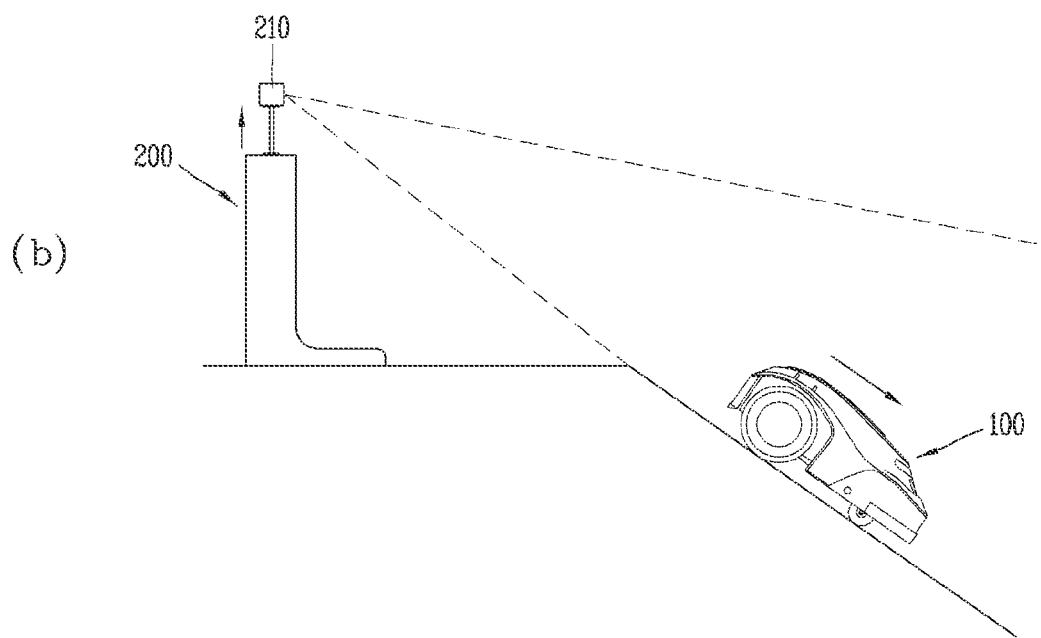
(b)

MOVING ROBOT SYSTEM COMPRISING MOVING ROBOT AND CHARGING STATION

CROSS-REFERENCE TO RELATED APPLICATIONS

This application is the National Stage filing under 35 U.S.C. 371 of International Application No. PCT/KR2019/009546, filed on Jul. 31, 2019, which claims the benefit of earlier filing date and right of priority to Korean Patent Application No. 10-2019-0020047, filed on Feb. 20, 2019, the contents of which are all hereby incorporated by reference herein in their entirety.

TECHNICAL FIELD

The present invention relates to a moving robot system including a moving robot that autonomously travels a designated region and a charging system that charges the moving robot.

BACKGROUND ART

Generally, a moving robot is a device that automatically performs a predetermined operation while autonomously traveling a predetermined region without a user's manipulation. The moving robot performs its operation by detecting an obstacle installed in the region and approaching or avoiding the obstacle.

Such a moving robot may include a cleaning robot that carries out cleaning while traveling a region and also a lawn mower robot that mows lawns in the region.

Generally, a lawn mower may include a boarding-type apparatus capable of being ridden by a user to mow lawns or weed grass while traveling according to the user's driving and a work-behind-type or a hand-type apparatus capable of being manually pushed or pulled by a user to mow lawns. Such a lawn mower is an apparatus for mowing lawns while moving according to a user's direct manipulation, and thus the user may feel some inconvenience because he or she should directly operate the apparatus.

Thus, a moving robot-type lawn mower with means for mowing lawns, that is, a lawn mower robot has been studied. However, since a lawn mower robot operates not only indoors but also outdoors, it is necessary to set a region to be traveled in advance. Specifically, since the outdoor is an open space unlike the indoor, the region should be designated in advance and limited so that the robot can travel where lawns are planted.

To this end, in Korean Patent Publication No. 2015-0125508, in order to set the region to be traveled by a lawn mower robot, a wire is buried where lawns are planted so that a moving robot is controlled to move in the region surrounded by the wire. Then, the boundary for the moving robot is set based on a voltage induced by the wire.

Meanwhile, after the travel in the designated region is completed, the lawn mower robot may return to a charging station to charge its consumed battery.

Generally, the charging station may be installed in the designated region and may serve as a start point and an end point of the lawn mower robot. Also, the charging station may be installed in a low obstacle region so that the lawn mower robot can smoothly start or stop a traveling scenario.

Accordingly, there is a growing need for development of a lawn mower robot to be controlled by utilizing the charging station, and the development of various functions associated with the traveling for lawn mowing is actively being carried out.

Meanwhile, lawn mower robots usually operate outdoors rather than indoors, and thus the charging stations of the lawn mower robots are also often installed outdoors. Accordingly, such a lawn mower robot that is driven and charged outdoors has a high possibility of theft.

DISCLOSURE

Technical Problem

The present invention provides a moving robot system including a moving robot and a charging station, the moving robot system being capable of informing a user that the moving robot is being stolen in an optimized manner.

The present invention also provides a moving robot system capable of the charging station monitoring the traveling of the moving robot in an optimized.

The present invention also provides a moving robot system capable of enhancing a location recognition rate for the moving robot traveling outdoors by adjusting the height of the camera provided in the charging station.

Technical Solution

To achieve these and other advantages and in accordance with the purpose of this specification, as embodied and broadly described herein, there is provided a moving robot system including a moving robot, and a charging station, wherein the charging station a camera formed to capture the moving robot, a communication unit configured to communicate with the moving robot, a charging contact unit configured to charge the moving robot, and a control unit configured to control the camera to receive a preview image obtained by capturing the moving robot on the basis that the moving robot having been in contact with the charging contact unit is separated from the charging contact unit, and the control unit performs different types of control on the basis of whether information indicating that the moving robot is being separated from the charging contact unit is received before the moving robot is separated from the charging contact unit.

In an embodiment, the control unit may capture the preview image and transmit the captured image to a predetermined mobile terminal by means of the communication unit on the basis that the moving robot is separated from the charging contact unit while the information indicating that the moving robot is being separated from the charging contact unit is not received.

When the moving robot is separated from the charging contact unit after the information indicating that the moving robot is being separated from the charging contact unit is received, the control unit may monitor the moving robot using the preview image.

The camera may be rotatably formed, and the control unit may rotate the camera such that a graphic object corresponding to the moving robot is continuously included in the preview image even when the moving robot moves.

The control unit may extract location information of the moving robot using the preview image and transmit the extracted location information to the moving robot by means of the communication unit.

The camera may have an angle of view formed to be rotatable.

The camera may be formed to be movable up or down, and the control unit may move the camera up or down on the basis of whether the moving robot is approaching or receding from the charging station when the moving robot is separated from the charging contact unit after the information indicating that the moving robot is being separated from the charging contact unit is received.

The camera may be formed to be movable up or down, and the control unit may move the camera up or down on the basis that the moving robot is inclined when the moving robot is separated from the charging contact unit after the information indicating that the moving robot is being separated from the charging contact unit is received.

When a signal indicating that an error has occurred is received from the moving robot by means of the communication unit, the control unit may transmit the preview image received through the camera to a predetermined mobile terminal.

The control unit may transmit the preview image received through the camera to a mobile terminal on the basis that an image transmission request is received from the mobile terminal by means of the communication unit.

Advantageous Effect

The present invention can provide a new moving robot system capable of, when a moving robot is separated from a charging contact unit while information indicating that the moving robot is being separated from the charging contact unit is not received by means of a communication unit, determining that the moving robot is being stolen, capturing an image through a camera provided in a charging station, and transmitting the captured image to a predetermined mobile terminal to effectively notify the user of the theft situation.

The present invention can provide a moving robot system capable of effectively monitoring a moving robot traveling outdoors by providing a charging station having a camera formed to be movable up or down.

The present invention can provide a moving robot system capable of additionally providing information necessary for a moving robot to travel by using an image received through a camera provided in a charging station to correct the location of the moving robot or perform posture adjustment during homing of the moving robot.

The present invention can provide a moving robot system capable of increasing a recognition rate for a moving robot traveling outdoors and easily observing the moving robot even in an inclined terrain existing outdoors by using a charging station with a height-adjustable camera.

BRIEF DESCRIPTION OF THE DRAWINGS

FIGS. 7, 8A, and 8B are conceptual views illustrating the control method shown in FIG. 6.

DETAILED DESCRIPTION

Hereinafter, a moving robot associated with the present invention will be described in detail with reference to the accompanying drawings.

Embodiments disclosed herein will be described in detail with reference to the accompanying drawings, and it should be noted that technical terms used herein are used only to describe specific embodiments and are not intended to limit the technical spirit of the present invention.

First, the term "moving robot" used herein can be used in the same sense as the term "robot," "moving robot for lawn mowing," "lawn mower robot," "lawn mowing apparatus," or "lawn mowing-specific moving robot", and these terms are used interchangeably.

Figure 1:
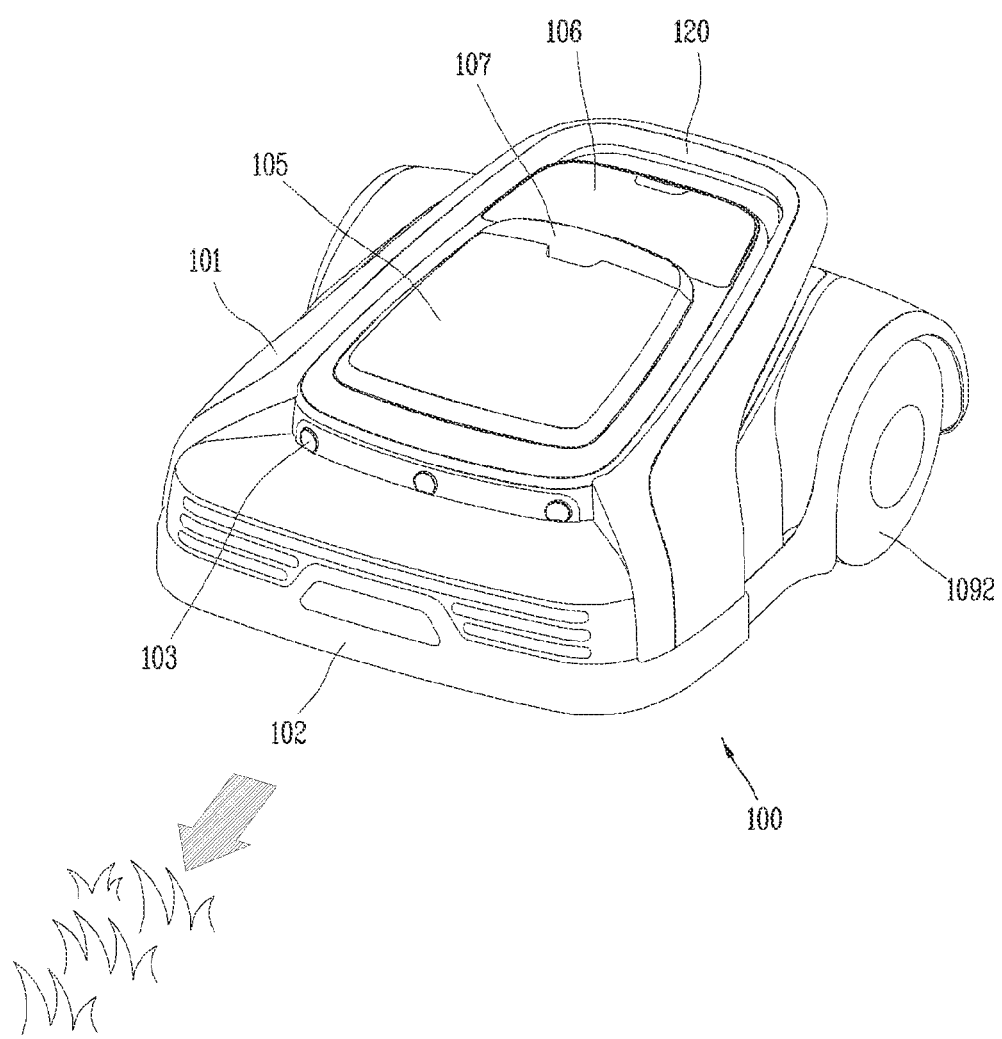
FIG. 1 is a perspective view showing an example of a moving robot according to the present invention.

FIG. 1 shows an example of a lawn mowing-specific moving robot according to the present invention.

The moving robot according to the present invention may be configured to include an outer cover 101, an inner body (not shown), and a wheel 1092.

The outer cover 101 may form an external appearance of the moving robot. The external appearance of the moving robot may be formed in a shape similar to, for example, a vehicle. The outer cover 101 may be formed to surround an outer side of the inner body (not shown).

The outer cover 101 may be mounted on an upper portion of the inner body to cover the upper portion of the inner body. A receiving part is formed inside the outer cover 101, and the inner body may be received in the receiving part.

A bumper part 102 may be formed in the front portion of the outer cover 101 in preparation for collision with an obstacle. The bumper part 102 may be formed of a rubber material capable of mitigating impacts.

A plurality of ultrasonic sensor modules 103 may be mounted on a front upper portion of the outer cover 101. The plurality of ultrasonic sensor modules 103 are configured to emit ultrasonic waves forward, receive reflective waves reflected by an obstacle, and detect a front obstacle while the robot is traveling.

The plurality of ultrasonic sensor modules 103 may be spaced apart from one another in a vehicle width direction. The plurality of ultrasonic sensor modules 103 may be spaced a certain distance rearward from the bumper part 102. Also, the plurality of ultrasonic sensor modules 103 may be placed by a signal-based sensor other than an ultrasonic sensor, for example, an ultra-wideband (UWB) sensor.

The moving robot may include a control unit and may receive a detection signal from the ultrasonic sensor module 103 and stop operation of the moving robot when an obstacle is detected.

A first upper cover 105 and a second upper cover 106 may be provided in an upper portion of the outer cover 101. Also, a stop switch may be installed between the first upper cover 105 and the second upper cover 106. The stop switch 107 is mounted so that it can be pushed by the outer cover 101. When a user pushes the stop switch 107 in an emergency situation once, the stop switch 107 may be turned on to stop the operation of the moving robot. When a user pushes the stop switch 107 one more, the operation of the moving robot may be resumed.

Each of the plurality of wheel 1092 may be connected to a driving motor located in the inner body, and may be rotatably mounted on both sides in the width direction of the inner body 160. each of the plurality of wheels 1092 may be connected to a driving motor by a driving shaft and may be rotated by receiving power from the driving motor.

The plurality of wheels 1092 may provide power to operate the robot, and each of the wheels 1092 may have revolutions independently controlled by the control unit.

Also, a handle 120 (which may also be referred to as a "carrying handle") may be installed on the outer cover 101 so that the user can grip the handle to carry the moving robot.

Figure 2:
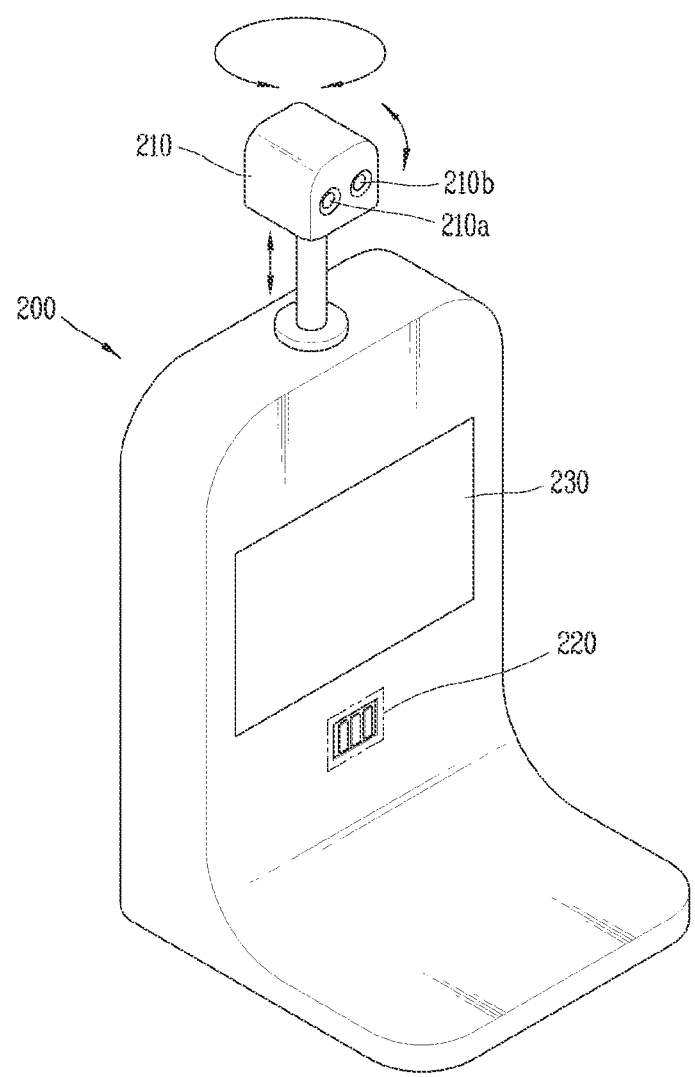
FIG. 2 is a perspective view showing an example of a charging station according to the present invention.

FIG. 2 is a perspective view showing an example of a charging station according to the present invention.

A charging station 200 may refer to a charging stand or a charger capable of charging a moving robot 100 and may be referred to as a docking station.

Here, the moving robot 100 being charged may mean that the battery of the moving robot 100 is charged when the moving robot 100 is wirelessly driven with the battery instead of being supplied with power in a wired manner.

The charging station 200 may receive power from an external power source and convert the received power into electric signals.

The charging station 200 may supply the electric signals to the moving robot 100 brought into contact through a charging contact unit 220 to charge the battery provided in the moving robot 100.

Also, the charging station 200 may deliver the power received from the external source to the moving robot 100 through the charging contact unit 220.

A connector (not shown) for coming into contact with the charging contact unit 220 of the charging station 200 may be provided in the moving robot 100. The charging contact unit 220 and the connector (not shown) may be made of a conductive member to transmit or receive electric signals.

Figure 4A:
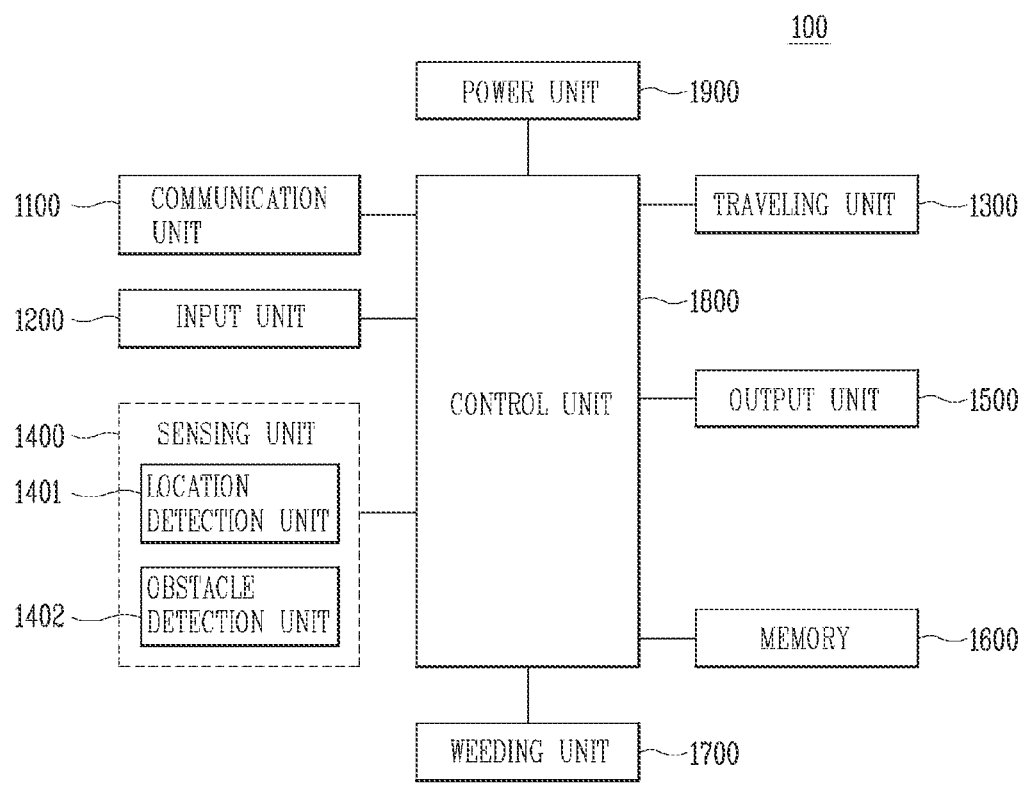
FIGS. 4A, 4B, and 4C are block diagrams illustrating a moving robot, a charging station, and a mobile terminal included in the moving robot system according to the present invention.
Figure 4B:
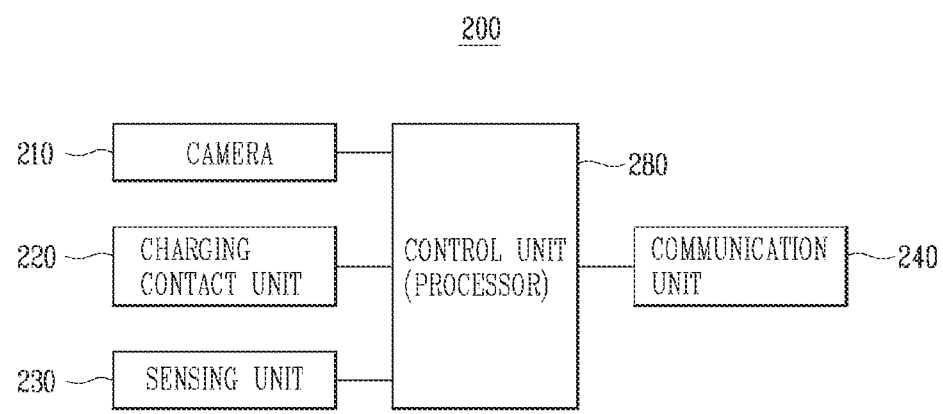

Referring to FIGS. 2 and 4B, the charging station 200 included in the moving robot system of the present invention may include a camera 210, the charging contact unit 220, a sensing unit 230, a communication unit 240, and a control unit 280 for controlling the components.

Referring to FIG. 2, the charging station 200 of the present invention may include the camera 210.

The camera 210 processes picture frames such as sill images or videos obtained by an image sensor in a photographing mode. The processed picture frames may be displayed on a display unit (not shown), stored in a memory (not shown), or transmitted to an external apparatus (e.g., a moving robot or a mobile terminal).

The camera 210 (or a camera unit) may include a plurality of cameras (or a plurality of camera lens) 210a and 210b.

The plurality of cameras (210a and 210b) provided in the charging station 200 may be arranged in a matrix structure. Through the cameras 210 forming the matrix structure, a plurality of pieces of image information having various angles or focal points may be input to the charging station 200.

Also, the plurality of cameras 210a and 210b may be arranged in a stereo structure so that a left image and a right image for implementing a stereoscopic image can be acquired.

The control unit 280 of the charging station 200 may determine (sense and detect) location information of an object (e.g., a distance to the object, an orientation (angle) of the object with respect to a front surface of the charging station, a traveling route (a traveling trajectory) of the object, etc.) captured through the plurality of cameras 210a and 210b using the left image and the right image received through the plurality of cameras 210a and 210b. Here, the object may be the moving robot 100.

Meanwhile, the camera 210 provided in the charging station 200 may be formed to move upward or downward, as shown in FIG. 2. For example, a driving unit (not shown) formed to move the camera 210 up and down may be connected to the camera (210) provided in the charging station 200. The control unit 280 may control the driving unit to move the camera 210 up or down.

Also, as shown in FIG. 2, the camera 210 provided in the charging station 200 may be rotated to the left or right or tilted up and down.

That is, the camera 210 may have an angle of view formed to be rotatable or changeable. When the camera is rotated to the left or right or tilted up or down, the space captured by the camera (i.e., the angle of view) may be rotated (or changed).

To this end, the camera 210 and a support member for supporting the camera 210 may be connected to each other through, for example, a pivot connection unit (not shown).

A driving unit for driving the pivot connection unit may be connected to the pivot connection unit. The control unit 280 may control the driving unit for driving the pivot connection unit to rotate or tilt the camera 210.

Thus, the rotation or tilting of the camera 210 may be performed by the control of the control unit 280.

Also, the charging station 200 may have the charging contact unit 220 formed to transmit or receive electric signals to or from the moving robot 100 and charge the battery provided in the moving robot 100.

When the charging contact unit 220 is brought into contact with the connector provided in the moving robot 100, the battery provided in the moving robot 100 may be charged.

Also, the charging station 200 may include the sensing unit 230. The sensing unit 230 may sense the location, traveling route, and posture (orientation) of the moving robot approaching the charging station 200.

Subsequently, the control unit 280 may transmit information sensed by the sensing unit 230 to the moving robot 100 by means of the communication unit 240 so that the moving robot can be properly docked to the charging station (or so that the connector of the moving robot are the charging contact unit of the charging station are in proper contact).

Also, the communication unit 240 may be formed to communicate with the moving robot 100, the mobile terminal 300, or an external server 400 in a wired/wireless manner.

The control unit 280 may be formed to control the camera 210, the charging contact unit 220, the sensing unit 230, and the communication unit 240.

Various embodiments of the present invention performed by the control unit 280 will be described in detail below with reference to FIGS. 5 and 6.

Figure 3:
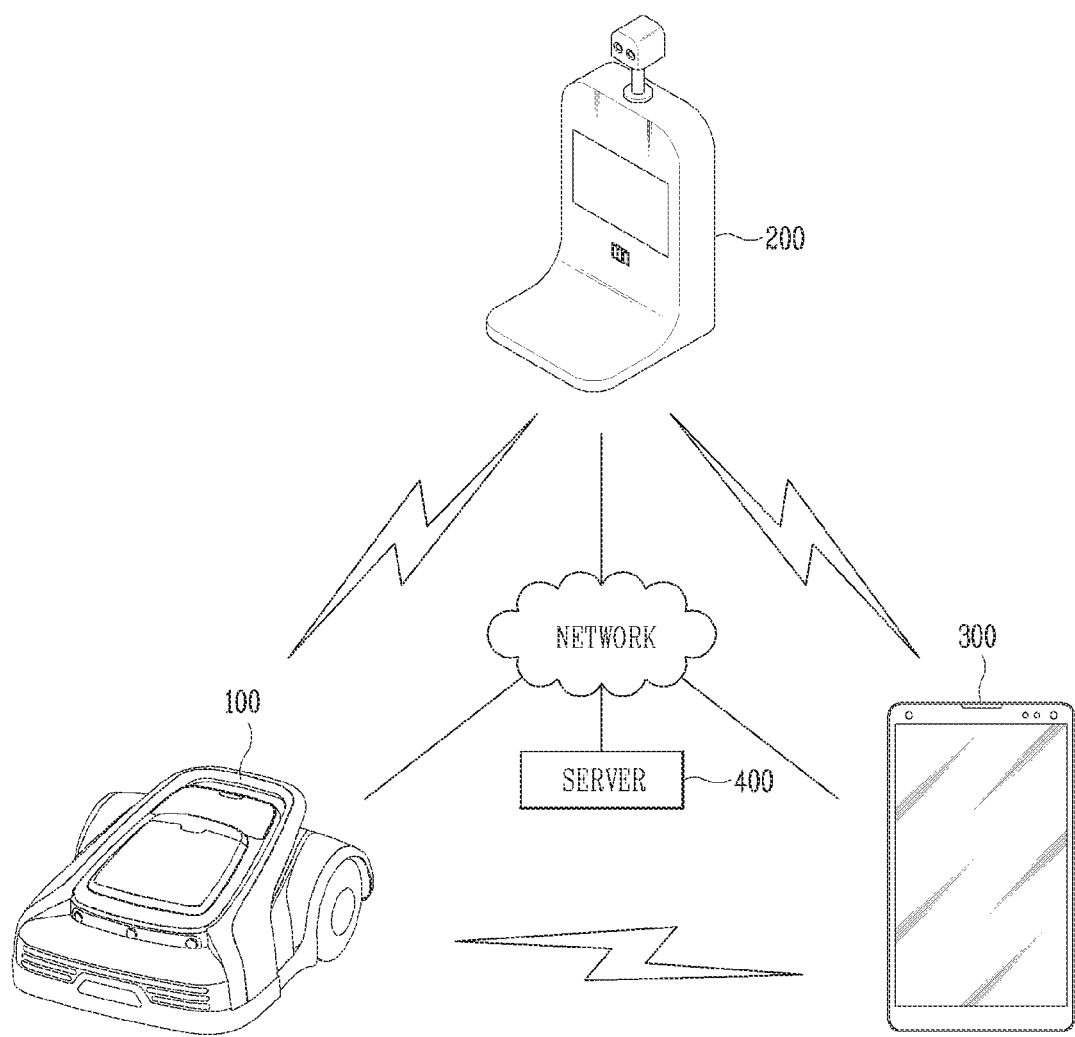
FIG. 3 is a conceptual view illustrating a moving robot system according to the present invention.

FIG. 3 is a conceptual view for describing a moving robot system according to the present invention.

FIG. 3 shows an aspect in which a moving robot 100, a charging station 200, a terminal 300, and a server 400 which are included in the moving robot system according to the present invention communicate with each other. The moving robot 100 according to the present invention may exchange data with the charging station 200 or the terminal 300 through network communication. Also, the moving robot 100 may perform a weed-related operation or a corresponding operation according to a control command received from the charging station or the terminal 300 through network communication or other communication. The charging station 200 may exchange data with the terminal 300 through network communication.

Here, the network communication may refer to at least one of the wireless communication technologies such as Wireless LAN (WLAN), Wireless Personal Area Network (WPAN), Wireless-Fidelity (Wi-Fi) Direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultra-wide Band, and Wireless Universal Serial Bus (Wireless USB).

Also, the other communication may refer to a wireless communication technology in which the moving robot 100 and the charging station 200, the moving robot 100 and the terminal 300, or the charging station 200 and the terminal 300 directly communicate with each other, not via a mobile communication network.

The shown network communication may vary depending on the moving robot's communication method.

In FIG. 3, the moving robot 100 may provide information sensed through each sensing unit to the charging station 200 or the terminal 300 through network communication. Also, the terminal 300 may deliver a control command generated based on the received information to the moving robot 100 through network communication.

Meanwhile, the terminal 300 may be referred to as a controller, a remote controller, or a terminal capable of being manipulated by a user to control an operation related to the driving of the moving robot 100. To this end, an application for controlling the operation related to the driving of the moving robot 100 may be installed in the terminal 300 and executed by the user's manipulation.

Also, in FIG. 3, the communication unit of the moving robot 100 and the communication unit of the terminal 300 may wirelessly communicate with each other directly or via a separate router (not shown). Thus, it is possible to determine mutual location information, information related to the driving operation of the moving robot, etc.

Also, the moving robot 100, the charging station 200, the terminal 300, and the server 400 may be connected to each other through a network to exchange data with each other.

For example, the server 400 may exchange data with the moving robot 100, the charging station 200, and/or the terminal 300 and register information regarding boundaries set for the moving robot 100, map information based on the boundaries, and obstacle information displayed on a map. Also, the server 400 may provide the registered information to the moving robot 100, the charging station 200, and/or the terminal 300 upon request.

The server 400 may be directly provided with wireless connection through the terminal 300. Alternatively, the server 400 may be connected to the moving robot 100 without the terminal 300.

The server 400 may include a programmable processor and have a variety of algorithms. As an example, the server 400 may have algorithms associated with execution of machine learning and/or data mining. As another example, the server 400 may have a voice recognition algorithm. In this case, when voice data is received, the server 400 may convert the received voice data into text data and then output the text data.

The server 400 may store firmware information and driving information (course information) for the moving robot 100 and register product information for the moving robot 100. For example, the server 400 may be a server operated by a cleaner manufacturer or a server operated by an open allocation store operator.

Figure 4C:
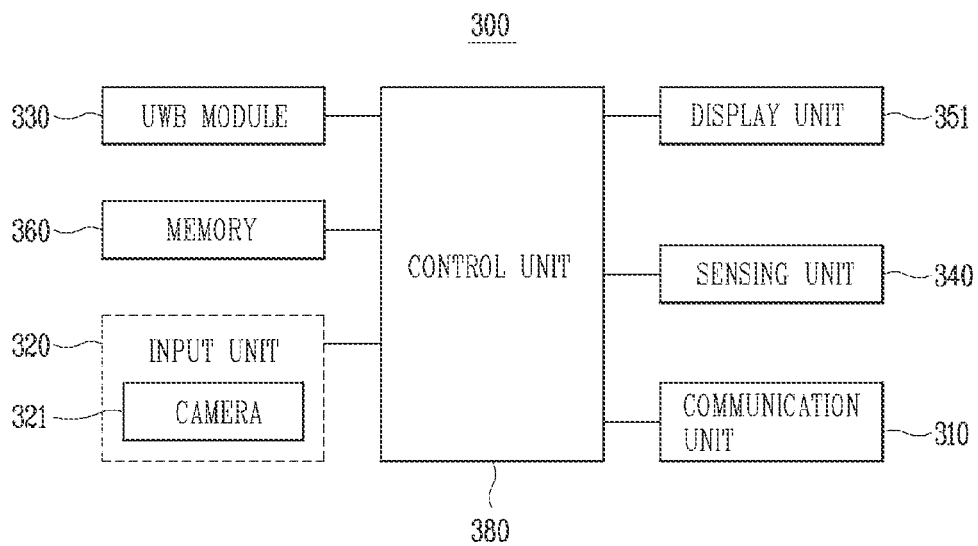

FIG. 4A is a block diagram showing an example configuration of the moving robot 100 according to the present invention, FIG. 4B is a block diagram showing an example configuration of the charging station 200, and FIG. 4C is a block diagram showing an example configuration of the terminal 300 communicating with the moving robot 100.

First, the configuration of the moving robot 100 will be described in detail below with reference to FIG. 4A.

As shown in FIG. 4A, the moving robot 100 may include a communication unit 1100, an input unit 1200, a traveling unit 1300, a sensing unit including a location detection unit 1401 and an obstacle detection unit 1402, an output unit 1500, a memory 1600, a weeding unit 1700, a control unit 1800, and a power unit 1900.

The communication unit 1100 may communicate with the terminal 300 in a wireless communication manner. Also, the communication unit 1100 may be connected to a predetermined network to communicate with an external server or a terminal for controlling the moving robot.

The communication unit 1100 may transmit information related to a generated map to the terminal 300. The communication unit 1100 may receive a command from the terminal 300 and may transmit data related to an operational state of the moving robot 100 to the terminal 300.

The communication unit 1100 may include a communicate module for WiFi and WiBro as well as a communication module for short-range wireless communication such as Zigbee and Bluetooth to transmit or receive data. Also, the communication unit 1100 may include a UWB module for transmitting UWB signals.

The input unit 1200 may include input means such as at least one button, switch, and touchpad. Also, the output unit 1500 may include output means such as a display and a speaker. When the output unit 1500 is used as both of the input means and the output means, the output unit 1500 may receive a user command through the display or speaker and may output an operational state of the moving robot.

In the memory 1600, an input detection signal, reference data for determining an obstacle, and obstacle information for a detected obstacle may be stored. Also, a control data for controlling the operation of the moving robot and data corresponding to a cleaning mode of the moving robot are stored in the memory 1600.

Collected location information and information regarding a traveling region and its boundary are stored in the memory 1600. For example, the memory 1600 may store data readable by a microprocessor and may be any one of a hard disk drive (HDD), a solid state disk (SSD), a silicon disk drive (SDD), a read-only memory (ROM), a random access memory (RAM), a CD-ROM, a magnetic tape, a floppy disk, and an optical data storage apparatus.

The traveling unit 1300 may include at least one driving motor and may enable the moving robot to move according to a control command of the control unit 1800. The traveling unit 1300 may include a left-wheel driving motor for rotating a left wheel and a right-wheel driving motor for rotating a right wheel. Also, the traveling unit 1300 may further include one or more auxiliary wheels for stable support.

For example, when the main body of the moving robot travels, the left-wheel driving motor and the right-wheel driving motor are rotated in the same direction.

When the left-wheel driving motor and the right-wheel driving motor are rotated in different speeds or in opposite directions, the traveling direction of the main body 10 may be changed.

The weeding unit 1700 mows lawns while the moving robot travels. The weeding unit 1700 may be provided with a brush or a cutter blade to mow lawns through rotation of the brush or the cutter blade.

The obstacle detection unit 1402 may include a plurality of sensors and detects an obstacle in front of the moving robot. The obstacle detection unit 1402 may detect an obstacle in front of the main body, that is, an obstacle located in a traveling direction by using at least one of laser waves, ultrasonic waves, infrared waves, and a three-dimensional (3D) sensor.

Also, the obstacle detection unit 1402 may include a camera configured to capture a front image and detect an obstacle. The camera may be digital camera, which includes an image sensor (not shown) and an image processing unit (not shown). The image sensor is an apparatus for converting an optical image into electrical signals and is configured as a chip with multiple photo diodes integrated therein. As a photo diode, a pixel may be exemplified. Charges are accumulated in respective pixels by an image that is formed in the chip by light passing through a lens, and the charges accumulated in the pixels are converted into electrical signals (e.g., voltage). As such image sensors, a charge coupled device (CCD) and a complementary metal oxide semiconductor (CMOS) are well known. Also, a digital signal processor (DSP) may be provided as the image processing unit.

The location detection unit 1401 includes a plurality of sensor modules for transmitting and receiving location information. The location detection unit 1401 includes a Global Positioning System (GPS) module for transmitting and receiving GPS signals or a location sensor module for transmitting and receiving location information from a location information transmitter. For example, when the location information transmitter transmits signals in the form of any one of an ultrasonic signal, a UWB signal, and an infrared signal, a sensor module for transmitting and receiving the ultrasonic signal, UWB signal, or infrared signal in response to the transmission is provided.

When the sensor module is implemented as a UWB sensor module, signals may be transmitted or received to pass through an obstacle when the obstacle is present between the location information transmitter and the moving robot 100. Thus, transmission or reception of UWB signals is smoothly performed in a certain region.

The location information transmitter may be provided as a single transmitter or a plurality of transmitters. For example, the location information transmitter may be included in the charging station 200.

Unless otherwise stated in the present invention, it may be presumed that the location information transmitter and the moving robot 100; the location information transmitter and the charging station 200; the location information transmitter and the terminal 300; the moving robot 100 and the charging station 200; and the moving robot 100 and the terminal 300 have at least one UWB sensor module and thus can exchange UWB signals therebetween.

Also, even when the moving robot 100 moves to follow the terminal 300, the location may be determined using the above-described sensor module.

For example, when the moving robot 100 travels to follow the terminal 300, the terminal and the moving robot have each a UWB sensor and perform wireless communication with each other. The terminal transmits signals through the UWB sensor provided therein, and the moving robot may determine the location of the terminal on the basis of the signals of the terminal received through the UWB sensor and then may move to follow the terminal.

As described above, the UWB signals of the UWB sensor may be transmitted to pass through an obstacle. Thus, even a user moving while holding the terminal does not affect signal transmission. However, when the obstacle has a certain size or lager, no signal may be transmitted or the transmission distance may be reduced though signals pass through the obstacle.

Also, the UWB sensors provided in the terminal and the moving robot may estimate or measure a distance between the sensors. When the moving robot travels to follow the terminal, the traveling of the moving robot is controlled such that the distance from the terminal is not greater than a predetermined distance. That is, the moving robot may travel to follow the terminal while maintaining a proper distance such that the distance between the moving robot and the mobile terminal is not too close or too far.

The location detection unit may include one UWB sensor or a plurality of UWB sensors. For example, when the location detection unit 1401 has two UWB sensors, the UWB sensors may be provided on the left and right sides of the main body of the moving robot to receive a plurality of signals, compare the signals, and detect the location.

For example, when the distances measured by the left sensor and the right sensor are different depending on the locations of the moving robot and the terminal, the location detection unit 1401 may determine the relative location of the terminal with respect to the moving robot and the direction of the moving robot.

Meanwhile, the sensing unit 1400 may include various sensors such as a cliff detection sensor installed on the rear surface of the main body to detect a cliff, a rain sensor for detecting humidity or a rainy weather condition, a proximity sensor, a touch sensor, a red-green-blue (RGB) sensor, a battery gauge sensor, an acceleration sensor, a geomagnetic sensor, a gravity sensor, a gyroscope sensor, an illuminance sensor, an environmental sensor (a thermometer, a radiation detection sensor, a heat detection sensor, a gas detection sensor, etc.), a plurality of 360-degree sensors, and a bottom state detection sensor, and the like, in addition to the above-described obstacle detection unit 1402 and location detection unit 1401.

Also, the sensing unit 1400 may include at least one gradient sensor (not shown) to detect movement of the main body. When the main body is inclined forward, backward, to the left, and to the right, the gradient sensor calculates an inclined direction and angle. A tilt sensor, an acceleration sensor, or the like may be used as the gradient sensor, and also any one of a gyro-type sensor, an inertial-type sensor, and a silicon-semiconductor-type sensor may be available as the acceleration sensor. In addition, various sensors or devices for detecting movement of the main body may be used.

The control unit 1800 controls input and output of data and controls the traveling unit 1300 such that the moving robot travels according to settings. The control unit 1800 may enable the main body 10 to travel straight or rotate by controlling the traveling unit 1300 to independently control operations of the left driving motor and the right driving motor.

The control unit 1800 controls the traveling unit by determining a traveling direction in response to a signal received through the sensing unit 1400. Also, the control unit 1800 controls the traveling unit 1300 to cause the moving robot to travel or stop according to a distance to the terminal and to change a traveling speed. Thus, the moving robot may move to follow a location corresponding to a change in location of the terminal.

Also, the control unit 1800 may control the moving robot to move to follow the terminal 300 according to a setting mode.

Also, the control unit 1800 may set a virtual region boundary on the basis of the location information received from the terminal 300 or the location information calculated through the location detection unit 1401. Also, the control unit 1800 may set any one of the regions formed by the boundary as a traveling region. The control unit 1800 sets the boundary in the form of a closed loop by connecting discontinuous pieces of location information by a straight line or a curved line and sets an inner region thereof as a traveling region. Also, when a plurality of boundaries are set, the control unit 1800 may set any one of the regions formed by the boundaries as a traveling region.

When the traveling region and the corresponding boundary are set, the control unit 1800 controls the traveling unit 1300 such that the moving robot 100 does not go beyond the boundary while traveling in the traveling region. The control unit 1800 calculates the current location on the basis of the received location information and controls the traveling unit 1300 such that the calculated current location is within the traveling region set by the boundary.

Also, the control unit 1800 may determine obstacle information input by the obstacle detection unit 1402 and may cause the moving robot 100 to avoid an obstacle while traveling. Also, if necessary on the basis of the obstacle information, the control unit 1800 may modify a predetermined traveling region.

For example, by changing a moving direction or a traveling path according to the obstacle information input from the obstacle detection unit, the control unit 1800 may control the traveling unit 1300 to pass through or avoid the obstacle.

Also, when a cliff is detected, the control unit 1800 may set the moving robot 100 not to approach the cliff within a certain distance. Also, by transmitting the traveling information to the terminal 300 and displaying the traveling information to the terminal 300 with respect to the detected obstacle, the control unit 1800 may change the traveling direction according to a user's selection which is input through the terminal 300.

The power unit 1900 includes a rechargeable battery (or a battery module) (not shown). The battery may be detachably mounted on the moving robot 100. When it is detected through the sensing unit 1400 that a battery gauge is insufficient, the control unit 1800 may control the traveling unit 1300 such that the moving robot 100 moves the location of the charging station for the purpose of battery charging. When the presence of the charging station is detected by the sensing unit 1400, the battery is charged.

Subsequently, referring to FIG. 4B, main elements of the charging station 200 that communicates with the moving robot 100 according to the present invention and charges the moving robot 100 will be described below.

Referring to FIG. 4B, the charging station 200 may include a camera 210 (or a camera unit), a charging contact unit 220, a sensing unit 230, a communication unit 240, and a control unit 280 (or a processor).

The corresponding description of FIG. 2 will be applied to the camera 210 and the charging contact unit 220.

The sensing unit 230 may be formed to sense peripheral information of the charging station 200. For example, the sensing unit 230 may sense an event having occurred in a space where the charging station 200 is installed.

Also, the sensing unit 230 may sense information related to the moving robot 100 or information related to the terminal 300.

For example, the sensing unit 230 may sense the distance between the moving robot 100 and the charging station 200, the location of the moving robot 100, and the orientation (or angle) at which the moving robot 100 is located, the traveling route (or the traveling trajectory) of the moving robot 100, and whether the moving robot 100 approaches the charging station 200.

Also, the sensing unit 230 may sense location information of the terminal 300 on the basis of the charging station 200.

To this end, the sensing unit 230 may have a UWB module provided in the terminal 300 or the moving robot 100 and a UWB module capable of transmitting and receiving UWB signals.

The sensing unit 230 may include various sensors such as a rain sensor capable of detecting humidity or a rainy weather condition, a proximity sensor, a touch sensor, an RGB sensor, an illuminance sensor, an environmental sensor (a thermometer, a radiation detection sensor, a heat detection sensor, a gas detection sensor, etc.), a plurality of 360-degree sensors, and a bottom state detection sensor, and the like.

In addition, the sensing unit 230 may include a distance measurement sensor.

The distance measurement sensor may emit at least one of a laser light signal, an infrared (IR) signal, an ultrasonic signal, a carrier frequency signal, and an impulse signal and may calculate a distance from the terminal 300 to the corresponding signal on the basis of the reflected signal.

To this end, the distance measurement sensor may include, for example, a time-of-flight (ToF) sensor. For example, the ToF sensor is composed of a transmitter that emits an optical signal transformed to a specific frequency and a receiver that receives and measures a reflected signal. When the ToF sensor is installed in the terminal 300, the transmitter and the receiver may be spaced apart from each other so that the transmitter and the receiver are not affected by the signal.

The communication unit 240 may communicate with an external server 400, the terminal 300, or the moving robot 100 through wireless communication. The communication unit 310 may include a communicate module for WiFi and Wibro as well as a communication module for short-range wireless communication such as Zigbee and Bluetooth to transmit or receive data. Also, the communication unit 240 may include a UWB module for transmitting UWB signals.

Also, the communication unit 240 may communicate with the server 400, the terminal 300, or the moving robot 100 through the above-described wireless communication. To this end, the communication unit 240 may be in wireless connection with a mobile communication network and may communicate with the server 400, the terminal 300, or the moving robot 100 through a mobile communication network.

However, the present invention is not limited thereto, and the communication unit 240 may be formed to directly communicate with the moving robot 100 or the terminal 300.

As an example, the control unit 280 may transmit an image received through the camera 210 to the terminal 300 by means of the communication unit 240.

Also, the control unit 280 may analyze the image received through the camera 210, determine (extract and calculate) location information of the moving robot 100, and transmit the determined location information to the moving robot 100 by means of the communication unit 240.

In addition, the charging station 200 of the present invention may perform various functions, and the related contents will be described in detail below with reference to FIGS. 5 to 8B.

Subsequently, main elements of the terminal 300 communicating with the moving robot 100 and the charging station 200 according to the present invention will be described with reference to FIG. 4C.

Referring to FIG. 4C, the terminal 300 may include a mobile terminal capable of being carried by a user and may include a communication unit 310, an input unit 320, a UWB module 330, a location detection unit 340, a display unit 351, a memory 360, and a control unit 380.

The communication unit 310 may communication with an external server, the charging station 200, or the moving robot 100 through wireless communication. The communication unit 310 may include a communicate module for WiFi and Wibro as well as a communication module for short-range wireless communication such as Zigbee and Bluetooth to transmit or receive data. Also, the communication unit 310 may include a UWB module for transmitting UWB signals.

The input unit 320 may include input means such as at least one button, switch, and touchpad.

The display unit 351 may include a touch sensor and may be configured to receive a control command through a touch input. Also, the display unit 351 may be configured to output a control screen for controlling the moving robot 100 and a map screen on which a set boundary and the location of the moving robot are displayed.

Data related to the traveling of the moving robot 100 may be stored in the memory 360. Also, the location information of the moving robot 100, the charging station 200, and the terminal 300 may be stored in the memory 360. In addition, information regarding the traveling region of the moving robot and the boundary may be stored in the memory 360. For example, the memory 360 may store data readable by a microprocessor and may be any one of an HDD, an SSD, an SDD, a ROM, a RAM, a CD-ROM, a magnetic tape, a floppy disk, and an optical data storage apparatus.

The location detection unit 340 includes a plurality of sensor modules for transmitting and receiving location information. For example, the location detection unit 340 may include a GPS module, a UWB module, a geomagnetic sensor, an acceleration sensor, a gyro sensor, and the like and may determine coordinates of a point indicated through a change in posture such as a gradient.

The UWB module 330 included in the location detection unit 340 or a separate UWB module 330 may exchange UWB signals with the moving robot 100 and/or the location information transmitter 50. Thus, the location detection unit 340 may determine the location of the moving robot 100 relative to the terminal 300, the location of the charging station 200 relative to the terminal 300, the location of the location information transmitter relative to the terminal 300, a specific location information transmitter relative the moving robot 100, etc., as well as the location of the terminal 300.

The UWB module 330 may transmit or receive UWB signals through the UWB module provided in the moving robot 100. The terminal 300 may serve as a "remote control apparatus" in that the terminal 300 can communicate with the moving robot 100 to control a traveling or weeding operation of the moving robot 100.

The terminal 300 may further include a gyro sensor and a distance measurement sensor in addition to the UWB module 310.

The gyro sensor may detect a change in three axial values corresponding to movement of the terminal 300. In detail, the terminal 300 may detect an angular velocity corresponding to a change in at least one of an x-axis value, a y-axis value, and a z-axis value.

Also, the gyro sensor may set an x-axis value, y-axis value, and z-axis value detected at a specific time as reference points and may detect an x'-axis value, y'-axis value, and z'-axis value changed with reference to the reference points after a predetermined input or after a predetermined time elapses. To this end, a magnetic sensor (not shown) and an acceleration sensor (not shown) may be additionally provided in the terminal 300 in addition to the gyro sensor.

The distance measurement sensor may emit at least one of a laser light signal, an IR signal, an ultrasonic signal, a carrier frequency signal, and an impulse signal and may calculate a distance from the terminal 300 to the corresponding signal on the basis of the reflected signal.

To this end, the distance measurement sensor may include, for example, a ToF sensor. For example, the ToF sensor is composed of a transmitter that emits an optical signal transformed to a specific frequency and a receiver that receives and measures a reflected signal. When the ToF sensor is installed in the terminal 300, the transmitter and the receiver may be spaced apart from each other so that the transmitter and the receiver are not affected by the signal.

Hereinafter, the above-described laser light signal, IR signal, ultrasonic signal, carrier frequency signal, impulse signal, and UWB signal may collectively be referred to as a "signal." In this specification, a "UBW" signal which is hardly affected by an obstacle will be described as an example. Accordingly, the distance measurement sensor may serve to calculate a distance from the terminal 300 to a point from which a signal is emitted. Also, the distance measurement sensor may include a transmitter that emits a signal and a receiver that receives a reflected signal. Alternatively, the distance measurement sensor may include a plurality of such transmitters and a plurality of such receivers.

The communication unit 310 and the location detection unit 340 of the terminal 300 may also be provided in the charging station 200. That is, the communication unit 240 included in the charging station 200 may be the communication unit 310 of the terminal 300 and may execute functions/operations/control performed by the communication unit 310 in the same or similar ways.

Also, the sensing unit 230 included in the charging station 200 may include the location detection unit 340 and/or the UWB module 330 provided in the terminal 300 and may execute functions/operations/control performed by the location detection unit 340 and/or the UWB module 330 of the terminal 300 in the same or similar ways.

The moving robot system according to the present invention may include the moving robot 100, the charging station 200, and the terminal 300 (hereinafter referred to as a mobile terminal).

The moving robot included in the moving robot system of the present invention may be a lawn mower robot for mowing lawns while traveling outdoors.

In this case, the moving robot travels outdoors and is often charged outdoors. Thus, the probability of theft of the moving robot is increased.

The present invention can provide a method of efficiently monitoring theft of the moving robot 100 by means of the charging station 200 and notifying a user when the theft occurs.

According to the present invention, a charging station may be provided outdoors. The present invention may also provide a method of efficiently monitoring a moving robot traveling outdoors by means of a charging station installed outdoors and helping the moving robot travel.

A method of the moving robot system of the present invention notifying a user of an occurrence of theft by means of the charging station 200, effectively monitoring the traveling of the moving robot, and correcting the location of the moving robot will be described in detail below.

Figure 5:
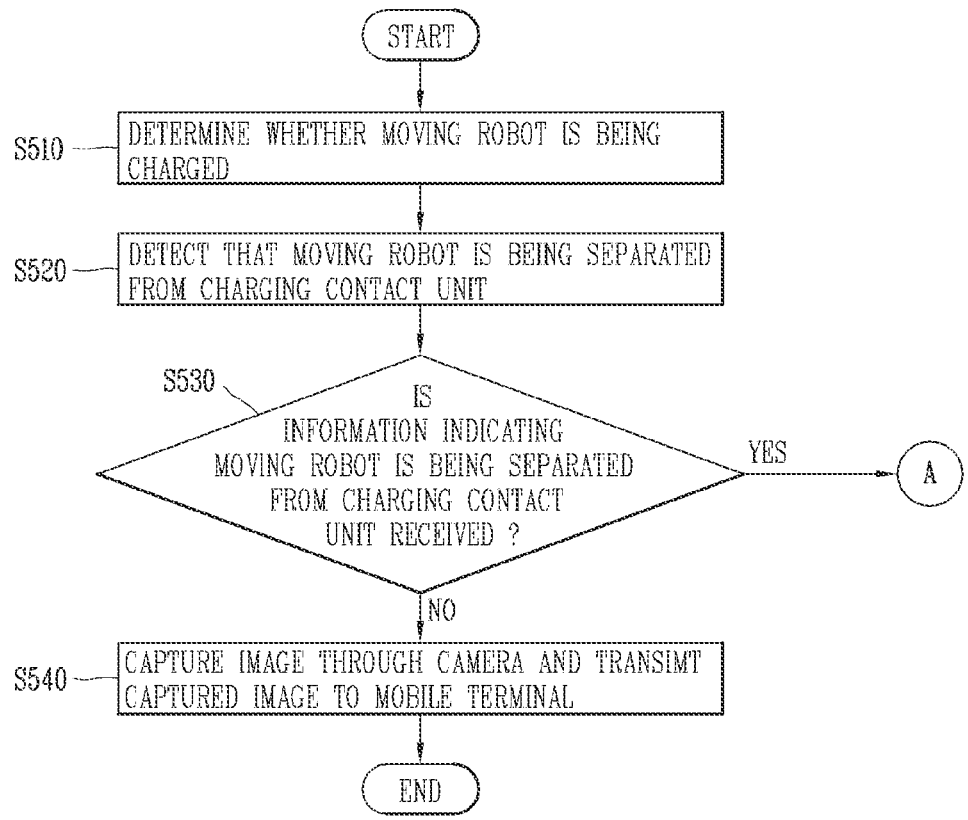
FIG. 5 is a flowchart illustrating a representative control method of the present invention.
Figure 6:
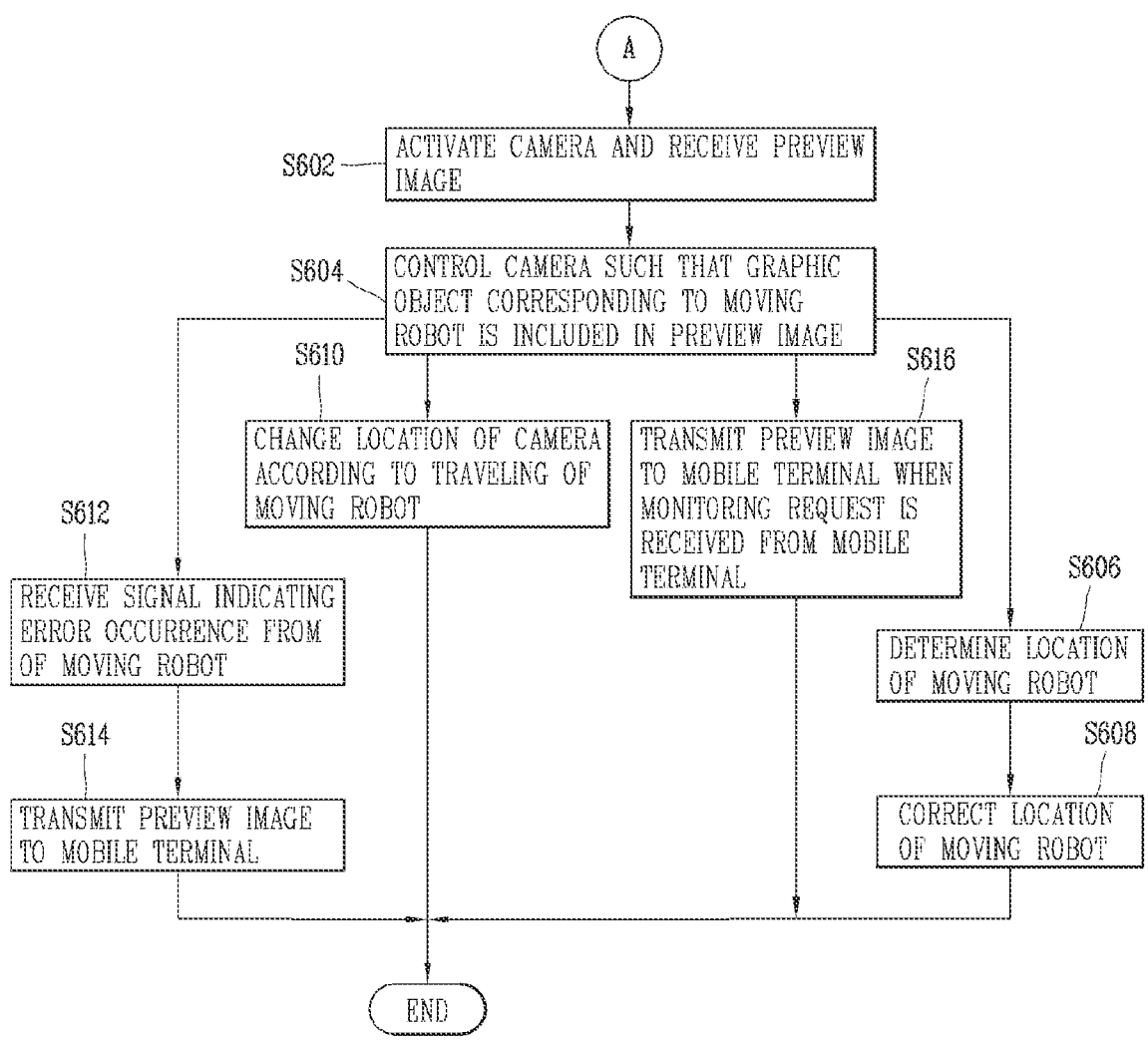
FIG. 6 is a flowchart illustrating a control method according to another embodiment of the present invention.
Figure 7:
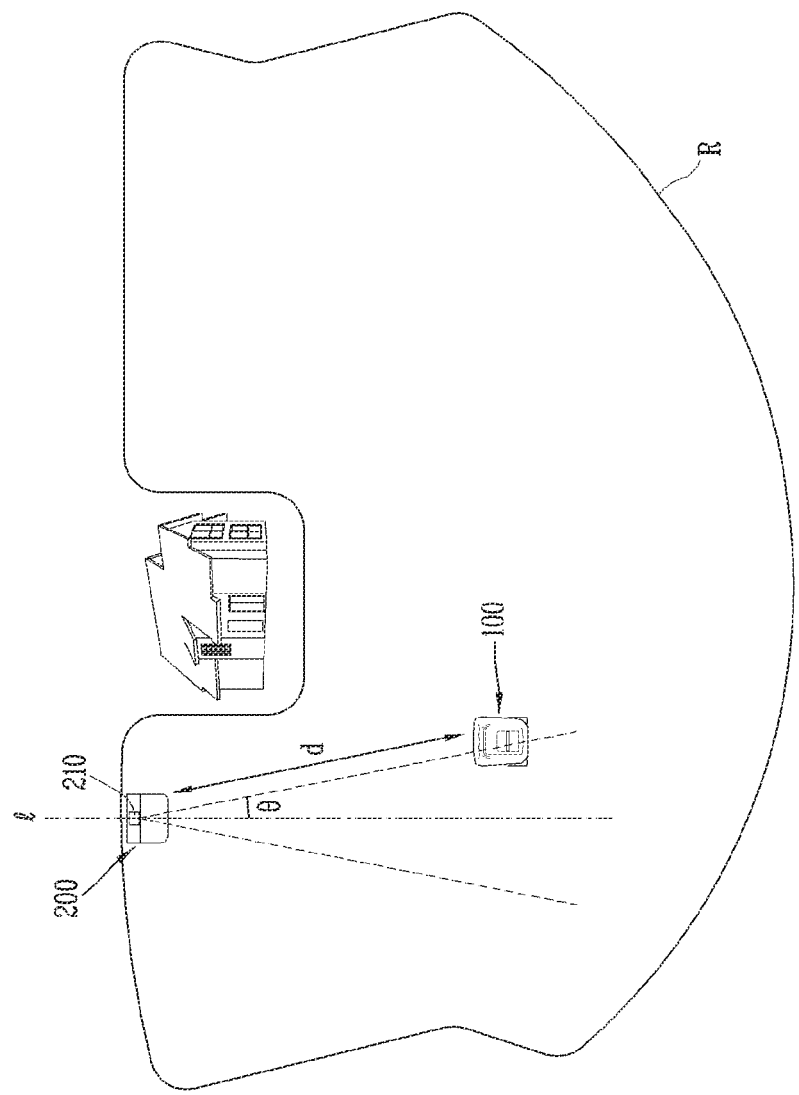

FIG. 5 is a flowchart illustrating a representative control method of the present invention, FIG. 6 is a flowchart illustrating a control method according to another embodiment of the present invention, and FIGS. 7, 8A, and 8B are conceptual views illustrating the control method shown in FIG. 6.

First, referring to FIG. 5, a method of notifying a user by means of the charging station 200 when a situation occurs in which theft of the moving robot 100 is suspected.

Referring to FIG. 5, according to the present invention, whether the moving robot is being charged is determined (S510).

In detail, the control unit 280 of the charging station 200 may determine whether the moving robot 100 is in contact with the charging contact unit 220 of the charging station 200 and may determine the moving robot 100 is being charged when the moving robot 100 is in contact with the charging contact unit 220.

For example, when electric signals (or power) are delivered to the moving robot 100 through the charging contact unit 220, the control unit 280 may determine that the moving robot 100 is being charged.

The moving robot 100 being charged may mean that the connector of the moving robot 100 and the charging contact unit 220 are in contact with each other.

When the moving robot 100 is not in contact with the charging contact unit 220, the control unit 280 may determine that the moving robot 100 is not being charged. In this case, the moving robot 100 may be autonomously traveling according to a predetermined algorithm.

Meanwhile, the control unit 280 of the charging station 200 may detect that the moving robot 100 having been in contact with the charging contact unit 220 is separated from the charging contact unit 220 (S520).

That is, the control unit 280 may detect that the moving robot 100 having been in contact with the charging contact unit 220 is separated from the charging contact unit.

For example, when the delivery of electric signals to the moving robot 100 (or the connector) through the charging contact unit 220 is stopped, the control unit 280 may determine that the moving robot 100 having been in contact with the charging contact unit 220 is separated from the charging contact unit 220.

In addition, the control unit 280 may sense (determine) whether the moving robot 100 is separated from the charging contact unit 220 by means of the sensing unit 230.

The control unit 280 may control the camera 210 to receive a preview image on the basis that the moving robot 100 having been in contact with the charging contact unit 220 is separated from the charging contact unit 220.

The control unit 280 may activate (or turn on) the camera 210 and receive an image through the activated camera 210 in real time on the basis that the moving robot 100 having been in contact with the charging contact unit 220 is separated from the charging contact unit 220. In this case, the image received in real time may be a preview image.

The control unit 280 may control the camera 210 to receive a preview image of the moving robot 100 on the basis that the moving robot 100 having been in contact with the charging contact unit 220 is separated from the charging contact unit 220.

The image received through the camera 210 may be referred to as a preview image and may refer to an image received (processed) through the camera 210 in real time. That is, the image received through the camera 210 (or the preview image) may be changed on the basis that the charging station 200 or the camera 210 is moved by external force and that objects (or subjects) existing within the angle of view of the camera 210 move.

When the preview image is captured, the captured image may be stored in a memory (not shown) in the form of any one of a still image and a video.

Meanwhile, before the moving robot is separated from the charging contact unit 220, the control unit 280 may determine whether information indicating that the moving robot 100 is being separated from the charging contact unit 220 has been received (S530).

That is, after the information indicating that the moving robot 100 is being separated from the charging contact unit 220 by means of the communication unit 240, the control unit 280 may determine whether the moving robot 100 is separated from the charging contact unit 220. Alternatively, while the information indicating that the moving robot 100 is being separated from the charging contact unit 220 has not been received, the control unit 280 may determine whether the moving robot 100 is separated from the charging contact unit 220.

Subsequently, the control unit 280 may perform different types of control on the basis of whether the control unit 280 has received the information indicating that the moving robot 100 is being separated from the charging contact unit 220 by means of the communication unit 240 before the moving robot 100 is separated from the charging contact unit 220.

Here, the information indicating that the moving robot 100 is being separated from the charging contact unit 220 may include (refer to) a variety of information (signals and control commands).

For example, the information indicating that the moving robot 100 is being separated from the charging contact unit 220 may include information indicating that the moving robot 100 will start traveling, which is received from the moving robot 100 or the terminal 300, a control command (or information) to allow the moving robot 100 to start traveling, which is input from the moving robot 100 or the terminal 300, etc.

That is, the information indicating that the moving robot 100 is being separated from the charging contact unit 220 may be information that is generated when a user controls the moving robot through the terminal 300 or the moving robot 100 and may be transmitted to the charging station 200 by means of the communication unit.

For example, the user may apply a control command for instructing the moving robot to start traveling by means of the terminal 300 or the moving robot 100. In this case, the information indicating that the moving robot 100 is being separated from the charging contact unit 220 may be delivered to the charging station 200.

Meanwhile, when the moving robot 100 is separated from the charging contact unit 220 by external force, not through the terminal 300 or the moving robot 100, the charging station 200 does not receive the information that the moving robot 100 is being separated from the charging contact unit 220. That is, this case may indicate, not that the traveling of the moving robot 100 is started by means of a user input unit of the terminal 300 or the moving robot 100, rather than that the moving robot 100 is moved by external force.

When the moving robot 100 is separated from the charging contact unit 220 while the information indicating that the moving robot is being separated from the charging contact unit 220 is not received, the control unit 280 may determine that the moving robot 100 is being stolen.

That is, when the information indicating that the moving robot is being separated from the charging contact unit 220 before the moving robot 100 is separated from the charging contact unit 220, the control unit 280 may determine that the moving robot 100 is being stolen.

The control unit 280 may capture a preview image on the basis that the moving robot 100 is separated from the charging contact unit 220 while the information indicating that the moving robot is being separated from the charging contact unit 220 and then may transmit the captured image to a predetermined mobile terminal 300 by means of the communication unit 240 (S540).

Also, the control unit 280 may transmit notification information that notifies the predetermined mobile terminal 300 that the moving robot 100 is being stolen on the basis that the moving robot 100 is separated from the charging contact unit 220 while the information indicating that the moving robot is being separated from the charging contact unit 220 is not received.

On the basis of a user's manipulation (or a user's request), the mobile terminal 300 may be transmit a request to receive the preview image to the charging station 200 by means of the communication unit after the notification information is output.

When the preview image request is received from the predetermined mobile terminal 300 after the notification information is transmitted, the control unit 280 may transmit the preview image to the predetermined mobile terminal 300 by means of the communication unit 240 in real time.

Here, among the above-described terminals 300, the predetermined mobile terminal may include a terminal preset (connected) to communicate with the charging station 200, a terminal having ever communicated with the charging station 200, a terminal set to control the moving robot 100, a terminal preset to communicate with the moving robot 100, a terminal having ever communicated with the moving robot 100, etc.

For example, the predetermined mobile terminal 300 may be a mobile terminal that is owned by the owner of the moving robot 100.

When the moving robot 100 is separated from the charging contact unit 220 while the information indicating that the moving robot 100 is being separated from the charging contact unit 220 is not received, the control unit 280 activates the camera 210, capture a preview image, and transmit the captured image to the predetermined mobile terminal. This is to capture the face of a thief who steals the moving robot 100 and inform the user of the captured image.

In this case, the control unit 280 may control the posture of the camera 210 such that a face object is included in the preview image.

For example, when the moving robot 100 is separated from the charging contact unit 220 while the information indicating that the moving robot 100 is being separated from the charging contact unit 220 is not received, the control unit 280 may activate a camera, analyzes a preview image received through the activated camera, and determine whether a face object is included in the preview image.

When the face object is included in the preview image, the control unit 280 may capture the preview image. Subsequently, the control unit 280 may transmit the captured image to the predetermined mobile terminal.

The control unit 280 may move the camera 210 up or down, rotate the camera 210, or tilt the camera 210 up or down such that the face object is included in the preview image when the face object is not included in the preview image.

Subsequently, when the face object is included in the preview image along with a change in posture of the camera 210, the control unit 280 may capture the preview image including the face object and may transmit the captured image to the predetermined mobile terminal.

Also, the control unit 280 of the charging station 200 may output the captured image to a display unit (not shown) provided in the charging station 200 and may output information indicating that the captured image is transmitted to the predetermined mobile terminal (the mobile terminal owned by the owner of the moving robot) to the display unit.

In this case, the control unit 280 may output the captured image to the display unit only when the face object is included in the captured image.

When the face object is not included in the captured image, the control unit 280 may not output the captured image to the display unit and may output, to the display unit, only information indicating that the captured image has been transmitted to the predetermined mobile terminal.

Through such a configuration, the present invention can provide a charging station that induces a thief who intends to steal the moving robot 100 to perceive or suspect that his or her face may be exposed and thus to stop the theft of the moving robot.

Meanwhile, when the moving robot is separated from the charging contact unit 220 after the information indicating that the moving robot 100 is being separated from the charging contact unit 220, the control unit 280 may determine that the control of the moving robot 100 is performed but in a theft situation but in a normal situation.

That is, when a control command for instructing the moving robot 100 to start traveling is applied through the terminal 300 or a user input unit provided in the moving robot 100, the moving robot 100 or the terminal 300 may transmit the information indicating that the moving robot 100 is being separated from the charging contact unit 220 to the charging station 200 by means of the communication unit.

Subsequently, after the moving robot 100 transmits the information indicating that the moving robot 100 is being separated from the charging contact unit 220, the moving robot 100 may be separated from the charging contact unit 220 and then may start traveling.

When the moving robot is separated from the charging contact unit 220 after the information indicating that the moving robot 100 is being separated from the charging contact unit 220, the control unit 280 may determine various functions associated with the traveling of the moving robot 100 (step A).

Various functions that are performed by the charging station 200 when the moving robot 100 normally starts traveling will be described below with reference to FIG. 6.

Referring to FIG. 6, the control unit 280 may activate a camera 210 and receive a preview image through the activated camera 210 through the activated camera 210 on the basis that the moving robot 100 is separated from the charging contact unit 220 (S602).

In this case, a time point at which the camera 210 is activated may be a time point at which the moving robot 100 is separated from the charging contact unit 220.

After the information indicating that the moving robot 100 is being separated from the charging contact unit 220 is received, the control unit 280 may monitor the moving robot 100 using the preview image on the basis that the moving robot 100 is separated from the charging contact unit 220.

In this case, the control unit 280 may control the camera 210 such that a graphic object corresponding to the moving robot is continuously included in the preview image even when the moving robot 100 is moved (S604).

That is, the camera 210 provided in the charging station 200 of the present invention may be rotated, moved up and down, and tilted up and down by the control of the control unit 280.

Controlling the camera such that the graphic object corresponding to the moving robot is continuously included in the preview image may mean tracking the moving robot through the camera.

That is, controlling the camera such that the graphic object corresponding to the moving robot is continuously included in the preview image may include rotating, tilting, or vertically moving (adjusting the height of) the camera 210 such that the camera can continuously capture the moving robot 100 (in other words, the moving robot 100 can be continuously captured by the camera 210).

In other words, the camera 210 of the charging station 200 is rotatably formed, and the control unit 280 may rotate the camera 210 such that the graphic object corresponding to the moving robot 100 is continuously included in the preview image even when the moving robot 100 moves.

The control unit 280 included in the charging station 200 of the present invention may determine the location of the moving robot using the camera 210 (S606).

The control unit 280 may extract location information of the moving robot using the preview image and may transmit the extracted location information to the moving robot 100 by means of the communication unit 240.

Referring to FIG. 7, the control unit 280 of the charging station 200 may determine the location of the moving robot 100 on the basis of one axis I of the charging station 200 on the basis of the posture of the camera (e.g., the degree to which the camera is rotated, the degree to which the camera is tilted, the height of the camera, etc.) and the preview image received through the camera 210.

For example, the location information of the moving robot 100 may include angular information (orientation information) $\theta$ of the moving robot 100 with respect to one axis I (e.g., a central axis) passing through the charging station 200 and distance information d of the moving robot 100 with respect to one point of the charging station 200.

For example, the control unit 280 may determine (calculate) a distance d to the moving robot 100 in a stereoscopic scheme by using a plurality of cameras 210*a* and 210*b*.

The control unit 280 may extract information regarding a depth to the graphic object corresponding to the moving robot included in previews image received through the plurality of cameras 210*a* and 210*b* by using the parallax between the preview images and may calculate information d regarding a distance between the moving robot 100 and the charging station 200 by using the depth information.

Also, the control unit 280 may calculate orientation information (or angular information) of the moving robot 100 with respect to the charging station 200 on the basis of the posture of the camera (whether the camera is oriented in a forward direction of the charging station 200, whether the camera is rotated, etc.) and the location of the moving robot detected in the preview image.

The control unit 280 may transmit the location information of the moving robot including the calculated distance information and the calculated orientation information to the moving robot 100 by means of the communication unit 240.

Subsequently, the moving robot 100 may correct its location determined in the moving robot 100 on the basis of the information received from the charging station 200 (S608).

Also, the control unit 280 may be involved in homing traveling of the moving robot 100 using the preview image received through the camera 210 during a homing process in which the moving robot 100 returns to the charging station 200.

Here, the homing process may refer to a process of the moving robot 100 returning to the charging station and coming into contact with the charging contact unit 220.

In detail, during the homing process, the control unit 280 may analyze the preview image received through the camera 210 to determine the posture of the moving robot, such as the location of the moving robot 100, a traveling route, the orientation of the moving robot 100, etc.

Subsequently, when the determined posture of the moving robot 100 is not suitable to come into contact with the charging contact unit 220, the control unit 280 may generate information for correcting the posture of the moving robot 100 and transmit the generated information to the moving robot 100. Here, the information for correcting the posture of the moving robot 100 may include information indicating in which direction and to which degree the moving robot is to be moved, information indicating to which degree the moving robot is to be rotated, etc.

The moving robot 100 may correct the posture of the moving robot 100 on the basis of the transmitted information and may transmit information for checking whether the corrected posture of the moving robot 100 is suitable to come into contact with the charging contact unit 220 to the charging station 200.

The control unit 280 of the charging station 200 may check the corrected posture of the moving robot 100 through the preview image received through the camera 210. When the corrected posture of the moving robot 100 is suitable to come into contact with the charging contact unit 220, the control unit 280 may transmit a control command to move the moving robot 100 to come into contact with the charging contact unit 220 (or a control command to control homing (or docking)) to the moving robot by means of the communication unit.

On the other hand, when the corrected posture of the moving robot 100 is not suitable to come into contact with the charging contact unit 220, the control unit 280 may generate additional connection information and transmit the additional correction information to the moving robot 100. The above process may be repeated until the moving robot 100 properly comes into contact with the charging contact unit 220.

Meanwhile, the control unit 280 of the charging station 200 may transmit the location information of the moving robot to the terminal 300 or the server 400 by means of the communication unit 240.

For example, when an error of a predetermined distance or greater occurs between first location information of the moving robot transmitted from the moving robot 100 and second location information of the moving robot transmitted from the charging station 200, the terminal 300 may correct the location of the moving robot 100 using the first location information and the second location information and may transmit the corrected location information to the moving robot 100.

As another example, the control unit 280 of the charging station 200 may receive the first location information of the moving robot 100 measured by the moving robot 100. In this case, the control unit 280 may compare the first location information and the second location information of the moving robot 100 determined through the camera 210, correct the location of the moving robot 100, and transmit the corrected location information to the moving robot 100.

Meanwhile, when the moving robot 100 is separated from the charging contact unit 220 after the information indicating that the moving robot 100 is being separated from the charging contact unit 220 is received, the charging station 200 of the present invention may change the location of the camera according to the traveling of the moving robot. This is for the charging station n200 to more accurately observe the traveling of the moving robot 100.

To this end, the camera 210 provided in the charging station 200 may be formed to move up or down. That is, the height of the camera 210 may be adjusted by the control of the control unit 280.

When the moving robot 100 is separated from the charging contact unit 220 after the information indicating that the moving robot 100 is being separated from the charging contact unit 220 is received, the control unit 280 may move the camera up or down on the basis of a distance between the moving robot 100 and the charging station 200.

For example, as shown in (a) of FIG. 8A, the control unit 280 of the charging station 200 may determine whether the moving robot 100 is approaching or receding from the charging station 200 by using the preview image received through the camera 210.

As shown in (a) of FIG. 8A, the control unit 280 may move the camera 210 up when the moving robot 100 is receding from the charging station 200.

Also, as shown in (b) of FIG. 8A, the control unit 280 may move the camera 210 down when the moving robot 100 is approaching the charging station 200.

Through such a configuration, the present invention can provide the charging station capable of easily tracking (observing) the moving robot by adjusting the height of the camera depending on whether the moving robot 100 is receding from or approaching the charging station 200.

Meanwhile, the control unit 280 may determine whether to move the camera up or down on the basis of the distance between the moving robot 100 and the charging station 200.

For example, when the distance between the moving robot 100 and the charging station 200 is a first distance d1 exceeding a reference value, the control unit 280 may move the camera 210 up as shown in (a) of FIG. 8A.

As another example, when the distance between the moving robot 100 and the charging station 200 is a second distance d2 less than or equal to the reference value, the control unit 280 may move the camera 210 down as shown in (b) of FIG. 8A.

Meanwhile, according to the present invention, it may be difficult for the charging station 200 to track (observe) the traveling of the moving robot 100 because the moving robot 100 frequently travels outdoors and there are many inclined terrains outdoors.

In order to solve this problem, when the moving robot is separated from the charging contact unit 220 after the information indicating that the moving robot 100 is being separated from the charging contact unit 220 is received, the control unit 280 included in the charging station 200 of the present invention may move the camera up or down on the basis of the inclination of the moving robot 100.

For example, when the inclination of the main body is detected while the moving robot 100 is traveling, the control unit 280 may transmit information including an inclination direction and an inclination degree to the charging station 200 by means of the communication unit.

The control unit 280 of the charging station 200 may determine whether, in which direction, or to which degree the moving robot 100 is inclined, etc.

Meanwhile, the present invention is not limited thereto, and control unit 280 may analyze the preview image received through the camera 210 and determine whether, in which direction, and to which degree the moving robot 100 is inclined.

As shown in (a) of FIG. 8B, the control unit 280 may move the camera 210 down when the front of the moving robot 100 is inclined upward because the moving robot 100 travels on an ascending slope. In this case, the control unit 280 may control the camera 210 such that the camera is tilted upward.

Through such an operation, the present invention may facilitate tracking of the moving robot 100 by capturing the moving robot 100 at a lower side when the moving robot 100 climbs the ascending slop.

Also, as shown in (b) of FIG. 8B, the control unit 280 may move the camera 210 up when the front of the moving robot 100 is inclined downward because the moving robot 100 travels on a descending slope. In this case, the control unit 280 may control the camera 210 such that the camera 210 is tilted downward.

Through such an operation, the present invention can provide a new charging station capable of controlling a camera to capture the moving robot 100 at an upper side in order not to fail to track the moving robot 100 when the moving robot 100 goes down on a descending slope.

Meanwhile, the control unit 280 may receive a signal indicating an error occurrence from the moving robot 100 by means of the communication unit 240 (S612). In this case, when a signal indicating that an error occurs is received from the moving robot 100 by means of the communication unit 240, the control unit 280 may transmit the preview image received through the camera 210 to the mobile terminal 300 (S614).

That is, according to the present invention, various errors may occur, so that the moving robot 100 can no more travel when the moving robot encounters an obstacle, the moving robot falls into a pit such as porthole, or foreign substances are caught in the driving unit.

In this case, the moving robot 100 may transmit a signal indicating that an error occurs (or a signal indicating that an error has occurred) to the charging station 200.

When the signal indicating that the error occurs is received from the moving robot 100, the control unit 280 of the charging station 200 may transmit the preview image received through the camera 210 provided in the charging station 200 to the predetermined mobile terminal 300 in real time.

Meanwhile, it will be appreciated that when an error has occurred in the moving robot 100, the moving robot 100 may transmit an image received through the camera provided in the moving robot 100 to the predetermined mobile terminal 300.

The present invention may prove a new user interface capable of allowing a user to determine an erroneous situation of the moving robot 100 not from a first person viewpoint which is a viewpoint from the moving robot 100 but from a third person viewpoint which is a viewpoint from the charging station 200.

The user may receive a preview image transmitted from the moving robot 100 and a preview image transmitted from the charging station 200 through the terminal 300. In this case, the user may accurately determine whether the user may resolve the erroneous situation of the moving robot directly or through remote control with reference to the preview images.

Meanwhile, when a monitoring request is received from the mobile terminal 300 (the predetermined mobile terminal) by means of the communication unit 240, the control unit 280 may transmit a preview image to the mobile terminal 300 (S616).

That is, according to the present invention, when the user intends to monitor the traveling of the moving robot 100 through the camera 210 of the charging station 200 by means of the mobile terminal 300, the charging station 200 may receive an image transmission request from the mobile terminal 300.

The control unit 280 may transmit the preview image received through the camera 210 to the mobile terminal 300 on the basis that the image transmission request is received from the mobile terminal 300 by means of the communication unit 240.

In this case, the mobile terminal 300 may be the above-described predetermined mobile terminal.

In this case, the preview image received through the camera 210 provided in the charging station 200 may be output from the mobile terminal 300. Also, a user interface for controlling the camera 210 provided in the charging station 200 may be output from the mobile terminal 300, and the posture of the camera 210 provided in the charging station (the adjustment in height of the camera, the tilting of the camera, or the rotation of the camera) may be controller through the user interface.

Through such a configuration, the present invention can provide a moving robot system including a charging station for determining whether a moving robot is being stolen, capturing a thief using a camera provided in the charging station and notifying a user when the moving robot is being stolen, and monitoring the traveling of the moving robot in an optimized manner or correcting the location of the moving robot when the moving robot is not being stolen.

The moving robot 100 and the charging station 200 of the present invention may each have a UWB module (or a UWB sensor). For example, a UWB module may be included in a communication unit 1100 of the moving robot 100, and a UWB module may be provided in at least one of a sensing unit 230 or a communication unit 240.

The moving robot 100 and the charging station 200 may transmit and receive UWB signals through the UWB modules. Thus, the charging station 200 may communicate with the moving robot 100 using the UWB signals transmitted and received through the UWB module.

Also, the control unit 280 of the charging station 200 may calculate the distance between the charging station 200 and the moving robot 100 (or a separation distance separated from the moving robot 100) on the basis of the UWB signals transmitted and received to and from the moving robot 100.

For example, the UWB module provided in the moving robot 100 may be a UWB tag, and the UWB module provided in the charging station 200 may be a UWB anchor.

A UWB tag may refer to a UWB module provided in an apparatus whose relative location is to be found, and a UWB anchor may refer to a UWB module provided in an apparatus for calculating a relative location of an apparatus having the UWB tag.

Both of the UWB tag and the UWB anchor may transmit or receive UWB signals.

The control unit 280 of the charging station 200 may calculate a distance to the moving robot 100 in the ToF method using the UWB signals. The ToF method is a general technique, and thus a detailed description thereof will be omitted.

Also, the control unit 280 of the charging station 200 may determine orientation information (or angular information of the moving robot 100 with respect to one axis of the charging station 200 using the preview image received through the camera 210.

For example, the control unit 280 of the charging station 200 may determine the orientation information (or angular information) of the moving robot 100 with respect to one axis of the charging station 200 from the image received through the camera 210 on the basis of a location at which an object corresponding to the moving robot 100 is identified and the posture of the camera 210 (e.g., the degree to which the camera 210 is rotated or inclined with respect to the front of the charging station 200).

Meanwhile, the charging station 200 may have at least two UWB anchors, and the at least two UWB anchors may be disposed a predetermined distance apart from each other.

The control unit 280 of the charging station 200 may determine the orientation information (or the angular information) of the moving robot 100 with respect to one axis of the charging station 200 on the basis of a phase difference between UWB signals received through the at least two UWB anchors as well as the preview image received through the camera 210. In this case, a method of calculating the control unit 280 calculating the orientation information (or the angular information) of the moving robot on the basis of the phase difference between the signals received through the at least two UWB anchors may be an Angle of Arrival (AOA) method. The AoA method is also a general technique, and thus a detailed description thereof will be omitted.

The control unit 280 of the charging station 200 may control the camera 210 to track (or follow) the moving robot 100 when the moving robot 100 is docked (homed) to the charging station 200 on the basis of the orientation information (or the angular information) (hereinafter referred to as angular information regarding an angle at which the moving robot 100 is located) of the moving robot 100 based on one axis of the charging station 200 and the distance to the moving robot 100 which is calculated using the UWB signal of the charging station 200.

For example, the control unit 280 of the charging station 200 may calculate the angular information regarding the angle at which the moving robot 100 is located and the distance to the moving robot 100 using the UWB module and may determine in which direction the camera 210 should be oriented to capture the moving robot 100 on the basis of the calculated angular information.

Subsequently, the control unit 280 may rotate, vertically move, or tilt the camera 210 to be oriented in the determined direction.

Subsequently, the control unit 280 of the charging station 200 may guide the docking of the moving robot 100 using a preview image received through the camera 210 rotated to be oriented in the determined direction.

The control unit 280 of the charging station 200 of the present invention may determine a relative location of the moving robot 100 (i.e., the distance to the moving robot and angular information regarding an angle at which the moving robot is located) through the UWB module when the moving robot 100 is not included in the preview image received through the camera 210 (e.g., when the control unit 280 fails to capture (track) the moving robot 100 through the camera 210).

Subsequently, the control unit 280 of the charging station 200 may control (rotate, move, and tilt) the posture of the camera 210 such that the camera 210 capture the moving robot 100 (i.e., such that a graphic object corresponding to the moving robot 100 is included in the preview image) on the basis of the determined relative location.

Thus, according to the present invention, it is possible to track (or follow) the camera such that the graphic object corresponding to the moving robot 100 is included in the preview image again using the UWB module even when the graphic object corresponding to the moving robot 100 disappears from the preview image received through the camera 210.

Also, the control unit 280 of the charging station 200 may calculate the relative location and traveling route of the moving robot 100 using the preview image received through the camera 210 having a posture controlled to capture (track) the moving robot 100 and may transmit a control command to enable the moving robot 100 to be accurately (properly) docked (homed) to a charging unit of the charging station 200 to the moving robot 100 by means of the communication unit.

The control command may include a variety of information for allowing proper docking, such as information for controlling or correcting the traveling route of the moving robot 100, route information regarding a route through which the moving robot 100 should travel, etc.

The moving robot 100 may operate the main body of the moving robot 100 to come into proper contact with the charging contact unit of the charging station 200 on the basis of the received control command.

Through such a configuration, the present invention can provide a control method capable of the camera 210 quickly capturing (tracking) the moving robot 100 again when the moving robot 100 disappears from the field of view of the camera 210 at an important moment at which the moving robot 100 is docked (homed).

Thus, the present invention can provide a charging station capable of capturing a moving robot through a UWB module again even when the moving robot 100 disappears from the field of view of the camera 210 at an important moment at which the moving robot 100 is docked (homed) and properly guiding the docking of the moving robot through the captured image.

The present invention can provide a new moving robot system capable of, when a moving robot is separated from a charging contact unit while information indicating that the moving robot is being separated from the charging contact unit is not received by means of a communication unit, determining that the moving robot is being stolen, capturing an image through a camera provided in a charging station, and transmitting the captured image to a predetermined mobile terminal to effectively notify the user of the theft situation.

The present invention can provide a moving robot system capable of effectively monitoring a moving robot traveling outdoors by providing a charging station having a camera formed to be movable up or down.

The present invention can provide a moving robot system capable of additionally providing information necessary for a moving robot to travel by using an image received through a camera provided in a charging station to correcting the location of the moving robot or performing posture adjustment during homing of the moving robot.

The present invention can provide a moving robot system capable of increasing a recognition rate for a moving robot traveling outdoors and easily observing the moving robot even in an inclined terrain existing outdoors by using a charging station with a height-adjustable camera.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A moving robot system comprises:
a moving robot; and
a charging station,
wherein the charging station comprises:
  a camera formed to capture the moving robot;
  a communication unit configured to communicate with the moving robot;
  a charging contact unit configured to charge the moving robot; and
  a control unit configured to:
    control the camera to receive a preview image obtained by capturing the moving robot on the basis that the moving robot having been in contact with the charging contact unit is separated from the charging contact unit,
    determine the moving robot is being stolen when information indicating that the moving robot is being separated from the charging contact unit is not received before the moving robot is separated from the charging contact unit,
    determine the moving robot is in a normal state when the information is received before the moving robot is separated from the charging contact unit, and
    perform different types of control based on whether the moving robot is being stolen or in the normal state,
    wherein the information is received before the moving robot is separated from the charging contact unit when a specific control command for starting moving of the moving robot is transmitted to the charging station.

2. The moving robot system of claim 1, wherein the control unit captures the preview image and transmits the captured image to a predetermined mobile terminal by means of the communication unit on the basis that the moving robot is being stolen.

3. The moving robot system of claim 1, wherein the control unit monitors the moving robot using the preview image when the moving robot is in the normal state.

4. The moving robot system of claim 1, wherein the camera is rotatably formed, and
wherein the control unit rotates the camera such that a graphic object corresponding to the moving robot is continuously included in the preview image even when the moving robot moves.

5. The moving robot system of claim 1, wherein the control unit extracts location information of the moving robot using the preview image and transmits the extracted location information to the moving robot by means of the communication unit.

6. The moving robot system of claim 1, wherein the camera has an angle of view formed to be rotatable.

7. The moving robot system of claim 1, wherein the camera is formed to be movable up or down, and
wherein the control unit moves the camera up or down on the basis of whether the moving robot is approaching or receding from the charging station when the moving robot is in the normal state.

8. The moving robot system of claim 1, wherein the camera is formed to be movable up or down, and
wherein the control unit moves the camera up or down on the basis that the moving robot is inclined when the moving robot is in the normal state.

9. The moving robot system of claim 1, wherein when a signal indicating that an error has occurred is received from the moving robot by means of the communication unit, the control unit transmits the preview image received through the camera to a predetermined mobile terminal.

10. The moving robot system of claim 1, wherein the control unit transmits the preview image received through the camera to a mobile terminal on the basis that an image transmission request is received from the mobile terminal by means of the communication unit.

* * * * *